United States Patent [19]

Kobayashi et al.

[11] Patent Number: 5,414,278

[45] Date of Patent: May 9, 1995

[54] ACTIVE MATRIX LIQUID CRYSTAL DISPLAY DEVICE

[75] Inventors: Kazuhiro Kobayashi; Hiroyuki Murai; Masahiro Hayama, all of Amagasaki, Japan

[73] Assignee: Mitsushibi Denki Kabushiki Kaisha, Tokyo, Japan

[21] Appl. No.: 231,774

[22] Filed: Apr. 25, 1994

Related U.S. Application Data

[63] Continuation-in-part of Ser. No. 904,272, Jun. 25, 1992, abandoned.

[30] Foreign Application Priority Data

Jul. 4, 1991 [JP] Japan .................. 3-164140

[51] Int. Cl.⁶ .................. G02F 1/13; H01L 29/04
[52] U.S. Cl. .................. 257/72; 257/71; 257/382; 359/59
[58] Field of Search .................. 257/310, 59, 311, 72, 257/64, 71, 437, 382; 359/59

[56] References Cited

U.S. PATENT DOCUMENTS

| | | | |
|---|---|---|---|
| 5,056,895 | 10/1991 | Kahn | 359/71 |
| 5,132,819 | 7/1992 | Noriyama et al. | 359/59 |
| 5,153,702 | 10/1992 | Aoyama et al. | 359/59 |
| 5,173,792 | 12/1992 | Matsueda | 359/54 |
| 5,182,661 | 1/1993 | Ikeda et al. | 359/59 |

FOREIGN PATENT DOCUMENTS 0129234 5/1989 Japan.
0072392 3/1990 Japan.
0100024 4/1990 Japan.

Primary Examiner—Robert P. Limanek
Assistant Examiner—Alexander Oscar Williams
Attorney, Agent, or Firm—Oblon, Spivak, McClelland, Maier & Neustadt

[57] ABSTRACT

A pixel electrode and a line for a storage capacitor are sandwiched by first and second protecting films so as to position them in a different plane from a gate electrode and source/drain lines. An insulating film for a storage capacitor and the second protecting film remain at a crossing of the source line and a gate line, but part of them on a TFT is removed, when a pattern of the removal is at least partially deviated from a pattern of a contact hole in the first protecting film directly covering a polycrystalline Si film over the TFT, so that a short-circuit between lines and a breaking of the lines because of a level difference of film layers. Thus, an occurance of failure because of the short-circuit between lines is inhibited, and failure in the lines is reduced by reducing the breaking of the source line and/or the drain line.

10 Claims, 4 Drawing Sheets

F I G. 2
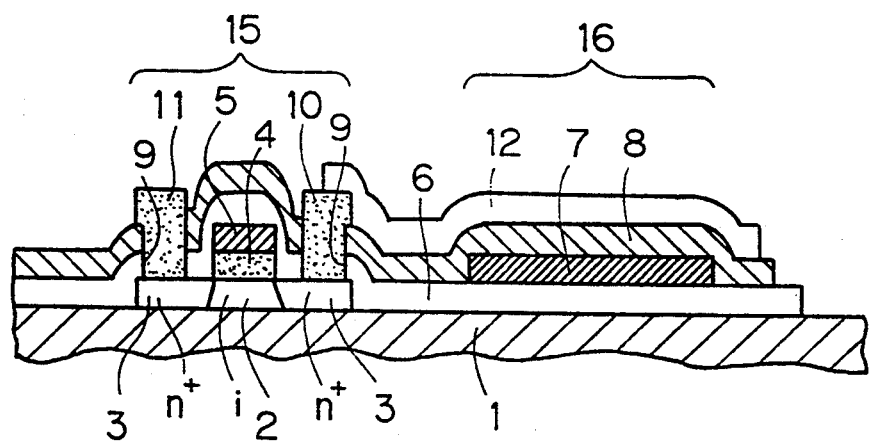
F I G. 3
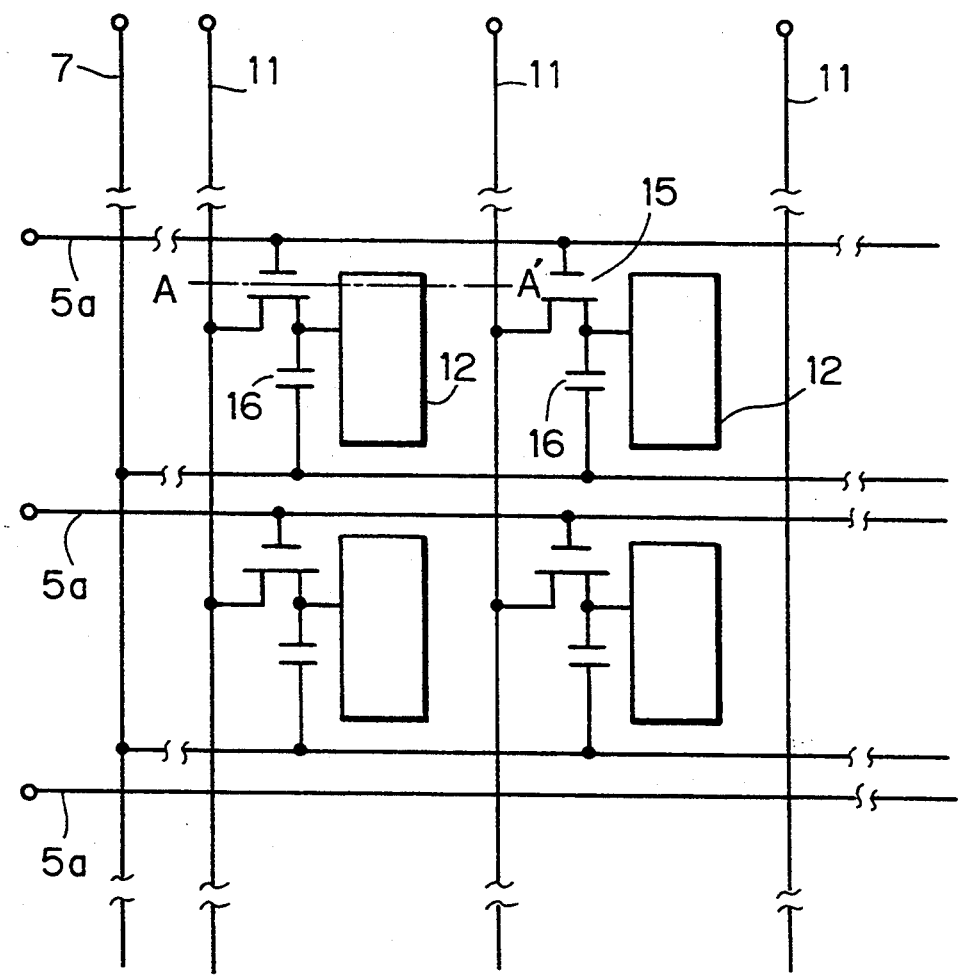

ACTIVE MATRIX LIQUID CRYSTAL DISPLAY DEVICE

This application is a Continuation-In-Part of application Ser. No. 07/904,272, filed on Jun. 25, 1992, now abandoned.

BACKGROUND OF THE INVENTION

1. Field of the Invention

The present invention relates to a semiconductor device which is incorporated in an active matrix liquid crystal display element where polycrystalline Si thin film transistors (each referred to as "TFT" hereinafter) are used as switching elements for pixels.

2. Description of the Prior Art

FIG. 2 shows a sectional structure of a TFT used for a conventional active matrix liquid crystal display device as disclosed in Japanese Patent Laying-Open Gazette No. 2-72392 (1990). Such a structure is comprised of an insulating substrate 1 of transparent glass or the like, a polycrystalline Si film 2, a doped Si region 3 with doped impurity by means of ion implantation to make metal and Si into contact, a gate insulating film 4 formed on the polycrystalline Si film 2, a gate electrode 5 formed on the gate insulating film 4, a protecting film 6 formed of insulating thin film for covering at least part of a TFT 15 consisting of the polycrystalline Si film 2, the gate insulating film 4 and the gate electrode 5. Provided also therein are a contact hole 9 defined in the protecting film 6 on the Si region 3 which is doped with the impurity, a drain line 10, a source line 11, and a pixel electrode 12 connected to the drain line 10. Further provided therein is a storage capacitor 16 consisting of a line 7, an insulating film 8 and the pixel electrode 12. As to the active matrix liquid crystal display element, its equivalent circuit is shown in FIG. 3, where the TFT 15 is positioned at a crossing of the source line 11 and a gate line 5a. The TFT 15 has its drain connected to the pixel electrode 12 and the storage capacitor 16.

Then, an operation of the device will be described. Voltage applied to the gate electrode 5 is varied to cause electric field across an inner portion of the polycrystalline Si film 2 underlying the gate insulating film 4 to vary, and consequently, current flowing through the contact hole 9 and the doped Si region 3 between the source line 11 and the drain line 10 is controlled. Thus, a transistor operation is implemented. Voltage is applied to the gate electrode 5 and the source line 11 to turn the TFT 15 on for its transistor operation, and the ON-state of the TFT 15 serving as a switch allows voltage to be applied to a liquid crystal unit on the pixel electrode 12 so that a state of liquid crystal molecules is changed to control an amount of light transmission. Liquid crystal is provided over the entire region of the structure shown in FIG. 2, but omitted in the drawings for simplification. The protecting film 6 is a film for protecting the TFT 15 from external contaminants and the like. The protecting film 6 is used as a layer insulating film at the crossing of the source line 11 and the gate line 5a. The storage capacitor 16 shown in FIG. 3 is comprised of the line 7, the insulating film 8 and the pixel electrode 12. The storage capacitor 16 functions to increase a load capacity observed on the side of the TFT 15, to reduce a DC voltage component applied to the liquid crystal and to lighten disadvantage about display characteristics, such as a residual image and the like. The insulating film 8 for the storage capacitor is used as a layer insulating film at the crossing of the source line 11 and the gate line 5a. The drain line 10 is connected to the pixel electrode 12. The pixel electrode 12 is formed of a transparent conductive film of ITO or the like, and it functions to apply voltage to the liquid crystal and to transmit visible light.

A conventional semiconductor device is configured as mentioned above. In such a semiconductor device including a plurality of such TFTs 15, one of the TFTs 15 has its pixel electrode 12 positioned in the same plane as the source line 11 which is connected to the adjacent TFT on the right side, as shown in FIG. 3, and hence, when some failure occurs in photolithography and etching process for patterning, for example, they are short-circuited and accordingly a malpractice of display may be caused. As to the contact hole 9, since the depth thereof is so large as equal to the sum of a thickness of the protecting film 6 added to a thickness of the insulating film 8 for the storage capacitor, breaking of the drain line 10 and the source line 11 often arises at an edge of the contact hole 9 when the source electrode and the drain electrode are formed. In the case where Al is used for the drain and source lines 10, 11 for example, the source and drain lines 11, 10 are formed, and thereafter, annealing process at 400° C. or over is often performed to improve an Ohmic characteristic with the doped Si region 3. However, once the annealing process is performed at a temperature of about 400° C. or over, hydrogen is generally released, which is contained in the Si film to conduct a hydrogen treatment with terminating dangling bonds existing in a grain boundary thereof for improvement of TFT characteristics. Then, such a hydrogen treatment must be performed after the formation of the source and drain lines 11, 10. In the case where the storage capacitor 16 is formed of SiN or the like which is high in dielectric constant and which facilitates an acquisition of a relatively high storage capacity value, since an SiN film remains on the TFT 15 and a diffusion coefficient of hydrogen in SiN is small, a hydrogen treatment cannot be performed after the formation of the insulating film 8 for the storage capacitor, and there arises the problem that characteristics of the resultant TFT are not so good as that of the TFT to which such a hydrogen treatment has been performed.

SUMMARY OF THE INVENTION

According to the present invention, in a semiconductor device which is incorporated in an active matrix liquid crystal display element and which has a plurality of gate lines for scanning lines, a plurality of source lines for data lines intersecting the gate lines, and a substrate having a thin film transistor of polycrystalline Si film connected to each of crossings of the gate lines and the source lines, a pixel electrode connected to the thin film transistor, and a storage capacitor also connected thereto, the semiconductor device comprises a first protecting film formed of insulating thin film on the thin film transistor for covering at least the thin film transistor and a gate line at a crossing of each of the gate lines with each of the source lines, an electrode for a storage capacitor, an insulating film for a storage capacitor, for covering at least part of the electrode for a storage capacitor and the gate line at the crossing, a pixel electrode formed of a transparent conductive film on the insulating film for a storage capacitor, and a second protecting film formed of an insulating thin film for covering at least the pixel electrode and the gate line at the crossing. The drain and source lines are formed on the first and second protecting films for connecting a drain or a source of the thin film transistor through a contact hole to the pixel electrode.

Preferably, the first protecting film consists essentially of $SiO_2$, and the insulating film for a storage capacitor consists essentially of $SiO_2$, $Ta_2O_5$, $Si_3N_4$, $Al_2O_3$ or TiO.

Preferably, the insulating film for a storage capacitor is patterned so that part thereof is not overlapped with a pattern of the first protecting film in at least a part of the thin film transistor, and the insulating film for a storage capacitor is removed from at least part of a region over the thin film transistor.

Preferably, the second protecting film consists essentially of $Ta_2O_5$, $Si_3N_4$, $Al_2O_3$, TiO OF $SiO_2$.

Preferably, the second protecting film is patterned so that part thereof is not overlapped with a pattern of the first protecting film and insulating film for a storage capacitor in at least a part of the thin film transistor, and the second protecting film is removed from at least part of a region over the thin film transistor.

Thus, the pixel electrode and the line for a storage capacitor are sandwiched by the first and second protecting films so as to position them in a plane different from the gate line and the source/drain lines, and therefore, it is prevented that failure in photolithography and the like causes the pixel electrode and the line for a storage capacitor, and the gate line and the source/drain lines to be short-circuited. The insulating film for a storage capacitor and the second protecting film remain at least at the crossing of the source line and the gate line, but at least part of them on the TFT is removed, when a pattern of the removal is at least partially deviated from a pattern of the contact hole in the first protecting film over the TFT, so that a breaking of the source/drain lines in the contact hole can be prevented. Additionally, even if a material, such as SiN, which cannot easily release hydrogen atoms is used for the insulating film for a storage capacitor and the second protecting film, a hydrogen treatment to improve TFT characteristics can be conducted in a stage close to the end of a TFT manufacturing process. Consequently, a range of allowable temperature in the heat treatment can be enlarged.

According to the present invention, a pixel electrode and an electrode for a storage capacitor are sandwiched by first and second protecting films, so that a source line or gate line and they can be prevented from being short-circuited, and TFT arrays can be gained at a high yield. Additionally, since a protecting film and an insulating film on a TFT are selectively removed by patterning so that they are not overlapped with each other, a hydrogen treatment can be conducted in a stage close to the end of a TFT producing process, and thus, a range of allowable temperature during a process can be enlarged, and a breaking of a source line and/or a drain line because of a level difference of film layers can be reduced.

In the present invention, a state where both of two elements are exposed in a stage is regarded as both of the two elements being in the same plane, but any other state is regarded as being in different planes.

Accordingly, it is an object of the present invention to provide a semiconductor device in which an occurance of failure because of a short-circuit between lines is inhibited, such failure in lines is reduced by avoiding a breaking of a source line and a drain line because of a level difference of film layers, and a hydrogen treatment can be conducted even in a stage so close to the end as possible in a TFT manufacturing process.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a sectional view showing a major portion of a conventional semiconductor device; and FIG. 3 is a plan view for explaining a structure of an active matrix board.

DESCRIPTION OF THE PREFERRED EMBODIMENT

Embodiment 1

Now, an embodiment of the present invention will be described.

Figure 1A:
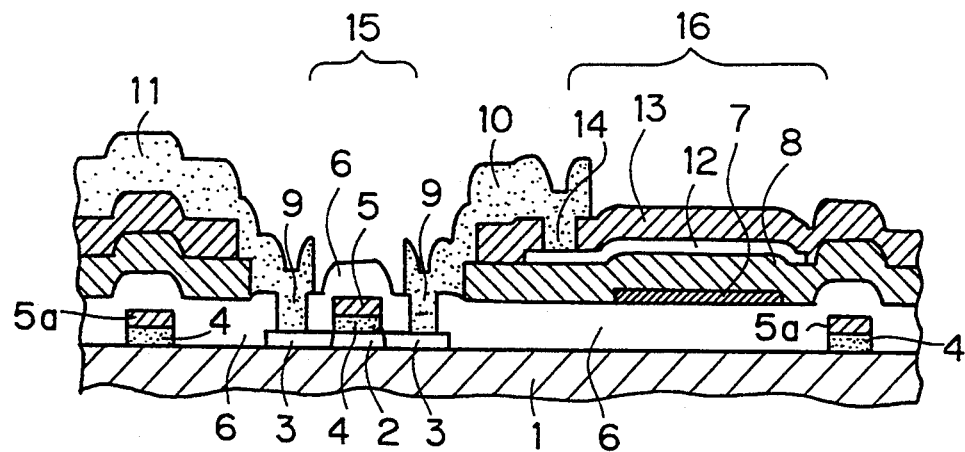
FIGS. 1A to 1C are sectional views showing a major portion of an embodiment of a semiconductor device according to the present invention.

In FIG. 1A, a semiconductor device of this embodiment is comprised of an insulating substrate 1 of glass or the like, a polycrystalline Si film 2, a doped Si region 3 with doped impurity by means of ion implantation to make metal and Si into contact, a gate insulating film 4 formed on the polycrystalline Si film 2, a gate electrode 5 formed on the gate insulating film 4, a gate line 5a linked to the gate electrode 5, a first protecting film 6 formed of insulating thin film for covering a TFT 15 consisting of the polycrystalline Si film 2, the gate insulating film 4 and the gate electrode 5 and the gate line 5a at least at a crossing of the gate line 5a with a source line 11, and as to the first protecting film 6, a film of $SiO_2$ or mainly composed of $SiO_2$ is employed. The semiconductor device further is comprised of a line 7 for a storage capacitor, and an insulating film 8 for the storage capacitor, formed of an insulating thin film for making a storage capacitor 16, and as to the insulating film 8, a film of $Ta_2O_5$, $Si_3N_4$, $Al_2O_3$ or TiO or mainly composed of each of them is used. It is also comprised of a first contact hole 9 defined in the first protecting film 6 on the doped Si region 3, a drain line 10, a source line 11, a pixel electrode 12 connected to the drain line 10, and a second protecting film 13 for covering the pixel electrode 12 and at least the gate line 5a at a crossing of the gate line 5a with the source line 11, and as to the second protecting film 13, a film of $Ta_2O_5$, $Si_3N_4$, $Al_2O_3$, TiO or $SiO_2$ or mainly composed of each of them is used. Reference numeral 14 denotes a second contact hole formed on the second protecting film 13.

Figure 1B:
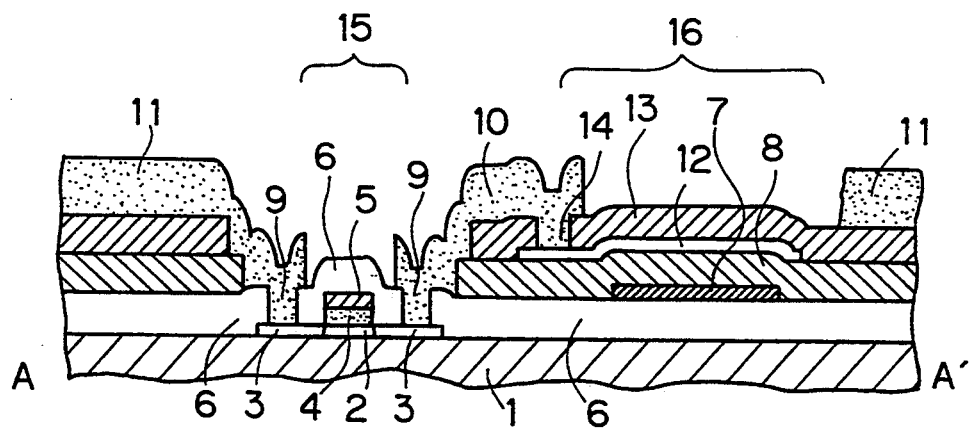
Figure 1C:
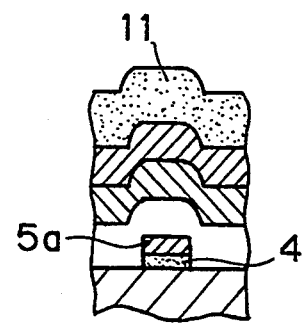

FIG. 1B is a sectional view along A-A' of FIG. 3, and FIG. 1C shows a crossing of the source line with the gate line 5a.

Then, an operation of the device will be described. Voltage applied to the gate electrode 5 is varied to cause electric field across an inner portion of the polycrystalline Si film 2 underlying the gate insulating film 4 to vary, and consequently, current flowing through the first contact hole 9 and the doped Si region 3 between the source line 11 and the drain line 10 is controlled. Thus, a transistor operation is implemented. The TFT 15 has its drain connected to liquid crystal and the storage capacitor 16 which are expressed as a capacity in an equivalent circuit. Voltage is applied to the gate electrode 5 and applied between the source and drain to turn the TFT 15 on for its transistor operation, and a control of current which flows in the TFT 15 serving as a switch causes voltage applied to a liquid crystal unit to be regulated so that a state of liquid crystal molecules are changed to control an amount of light transmission.

The first protecting film 6 is a film for protecting part of the TFT 15 from external contaminants and the like. The first protecting film 6 is also used as a layer insulating film at the crossing of the source line 11 and the gate line 5a. By virtue of the first protecting film 6, the line 7 for the storage capacitor is formed on a layer different from the gate line 5a, and it can prevent the gate line 5a and the line 7 from being short-circuited because of a failure of patterning.

The storage capacitor 16 shown in FIG. 3 is comprised of the line 7, the insulating film 8 and the pixel electrode 12 consisting of a transparent conductive film of ITO or the like, which are shown in FIG. 1A. The storage capacitor 16 functions to increase a load capacity observed on the side of the TFT 15, to reduce a DC voltage component applied to the liquid crystal, and to reduce disadvantageous display characteristics, such as an residual image and the like. The insulating film 8 for the storage capacitor is used as a layer insulating film at the crossing of the source line 11 and the gate line 5a.

The second protecting film 13 is formed covering the pixel electrode 12. In this way, the pixel electrode 12 is formed on a layer different from the source line 11, and this can prevent the pixel electrode 12 and the source line 11 from being short-circuited because of a failure of patterning. Also, the second protecting film 13 is used as a layer insulating film between the source line 11 and the gate line 5a. The drain line 10 is connected through the second contact hole 14 to the pixel electrode 12. The pixel electrode 12 is formed of a transparent conductive film of ITO or the like, and it functions to apply voltage to the liquid crystal and transmit visible light.

As shown in FIGS. 1A, 1B, the insulating film 8 for the storage capacitor and the second protecting film 13 are partly removed by patterning so that the edges thereof and the edge of the first insulating film 6 which underlies them is not coincident with at least part of a pattern. Similarly, at least a part of the TFT 15 is exposed by patterning for the edges of the source and drain electrodes 11, 10 not to coincide with that of the first insulating film 6. In this way, the possibility that a failure of breaking the pattern in an edge of the insulating film for the source and drain electrodes arises in connecting the source and drain electrodes to the doped Si region 3 in the TFT 15 can be reduced.

Moreover, even if $SiO_2$ which can easily transmit hydrogen is used for the first protecting film 6, the insulating film 8 and the second protecting film 13 of, for example, SiN which is relatively high in dielectric constant and advantageous in producing a device would not easily transmit hydrogen, and therefore, a hydrogen treatment in which hydrogen is utilized to terminate a dangling bond existing in a grain boundary of the polycrystalline Si film to improve a TFT characteristic cannot easily be conducted. Hence, when the insulating film 8 for the storage capacitor which is formed of SiN or the like remains on the TFT 15, the hydrogen treatment must be performed before a formation of the film, and additionally, a heat treatment under a temperature of about 300° C. or over cannot easily be conducted after the hydrogen treatment because the heat treatment under such a temperature cuts a combination of hydrogen with Si. However, removing the insulating film 8 for the storage capacitor and the second protecting film 13 on the TFT 15 as shown in FIGS. 1A, 1B, the hydrogen treatment after a formation of the source and drain lines 11, 10 can be conducted because such a film of SiN that transmits no hydrogen does not exist on the TFT 15, and a range of allowable temperature in the heat treatment before the formation of the source and drain lines 11, 10 can be enlarged. In this way, for example, after the source and drain lines 11, 10 are formed of Al, a heat treatment at about 450° C. to improve characteristics can be conducted. In addition to that, since the first protecting film 6, the insulating film 8 for the storage capacitor, and the second protecting film 13 are interlaid as layer insulating films at the crossing of the gate line 5a and the source line 11 in this embodiment, both the lines can be prevented from being short-circuited.

Embodiment 2

While all the first protecting film 6, the insulating film 8 for the storage capacitor, and the second protecting film 13 are interlaid as layer insulating films at the crossing of the gate line 5a and the source line 11 in the above embodiment, as an option, one or two of those films alone may be used as layer insulating film.

Embodiment 3

While the line 7 for the storage capacitor is laid on the first protecting film 6 in the above embodiments, the first protecting film 6 does not necessarily have to underlie the line 7.

Embodiment 4

Figure 1D:
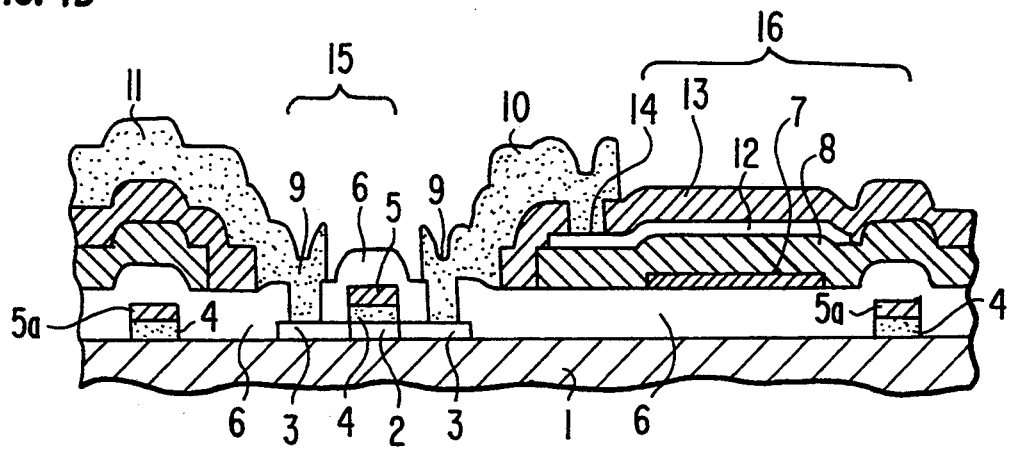
FIGS. 1D to 1F are sectional views showing a major portion of another embodiment of a semiconductor device according to the present invention.
Figure 1E:
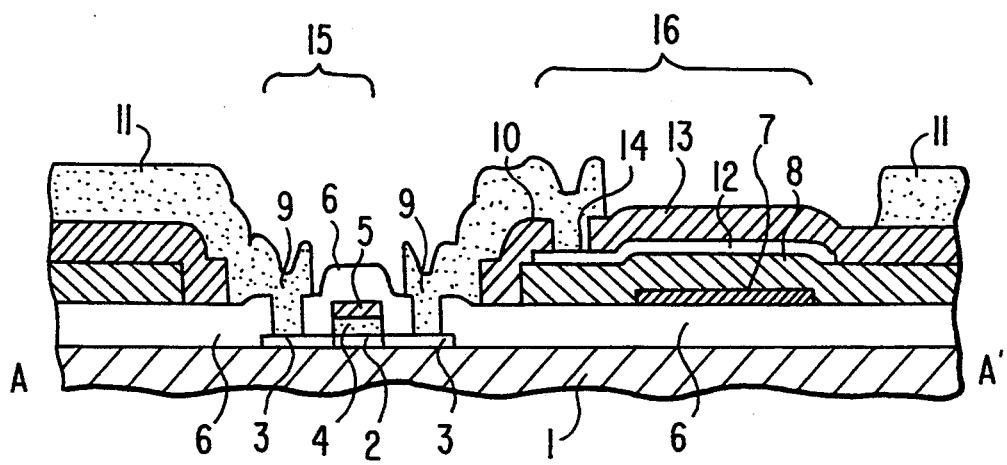
Figure 1F:
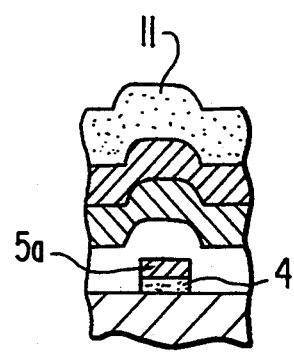

FIGS. 1D to 1F are cross sectional views which correspond to FIGS. 1A to 1C which show Embodiment 1. Between a portion where the TFT 15 is formed and a portion where the storage capacitor 16 is formed, the second protecting film 13 is formed above the first protecting film 6 as well. These two protecting films isolate the insulating film 8 for the storage capacitor from the drain line 11 and the source 10. This structure prevents exposure of, and hence, damage in the insulating film 8 for the storage capacitor during the etching for the formation of the second protecting film 13.

Embodiment 5

Figure 1G:
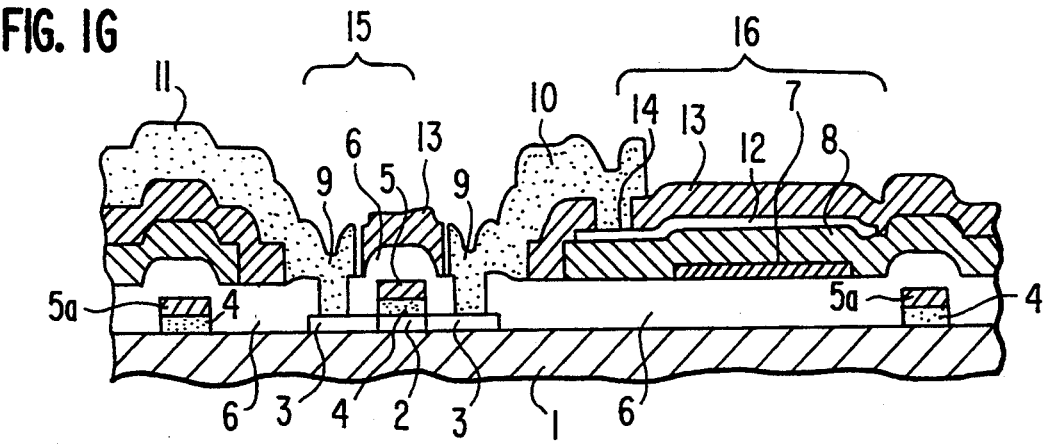
FIGS. 1G to 1I are sectional views showing a major portion of still another embodiment of a semiconductor device according to the present invention.
Figure 1H:
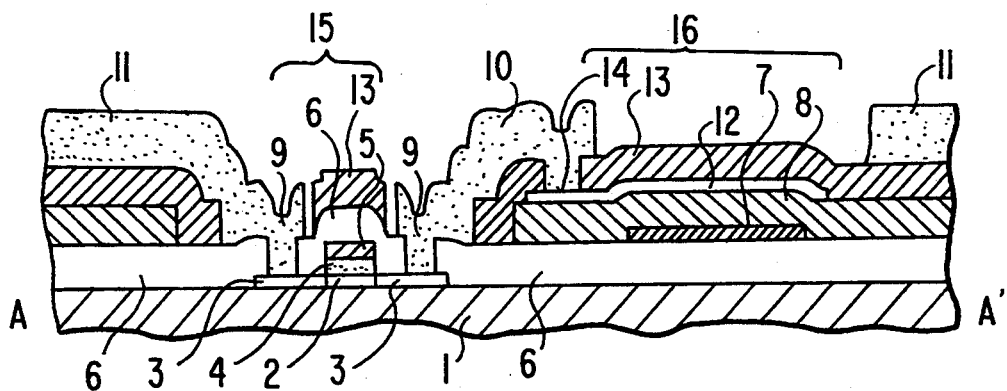
Figure 1I:
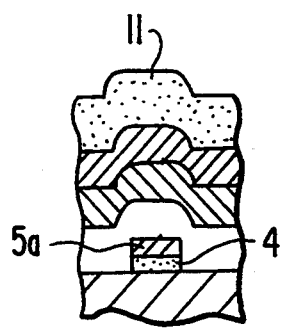

FIGS. 1G to 1I are cross sectional views which correspond to FIGS. 1A to 1C which show Embodiment 1. As can be seen, in addition to the structure according to Embodiment 4, the second protecting film 13 is present above the TFT 15. The second protecting film 13 is provided at least above the gate insulating film 4. The second protecting film 13, if made of $Si_3N_4$, prevents contamination from substances such as Na. $Si_3N_4$ is known as material which would not allow hydrogen to pass through. Therefore, it is desirable to perform a hydrogen treatment immediately after forming the first protecting film 6.

By providing the second protecting film 13 in such a manner that it covers the gate insulating film 4 through the first protecting film 6, the TFT 15 would be protected against possible later contamination. Alternatively, the insulating film for the storage capacitor 8, which is formed prior to formation of the second protecting film 13, may be left on the TFT 15. This protects TFT 15 against contamination at an earlier stage.

While the invention has been shown and described in detail, the foregoing description is in all aspects illustrative and not restrictive. It is therefore understood that numerous modifications and variations can be devised without departing from the scope of the invention.

We claim:

1. An active matrix liquid crystal display device comprising:
    an active matrix liquid crystal display element having a plurality of gate lines for scanning lines, and a plurality of source lines for data lines intersecting said gate lines at crossing points;
    a thin film transistor of polycrystalline Si film having a gate and a source which are respectively connected to said gate lines and said source lines in the vicinity of said crossing points, and having a drain;
    a storage capacitor connected to said thin film transistor;
    a first protecting film consisting essentially of a first insulating material on said thin film transistor for covering at least said thin film transistor and said gate lines at said crossing points;
    an electrode for said storage capacitor;
    an insulating film for said storage capacitor, for covering at least part of said electrode for said storage capacitor and said gate lines at said crossing points;
    a pixel electrode formed of a transparent conductive film on said insulating film for said storage capacitor and connected to said thin film transistor;
    a second protecting film consisting essentially of a second insulating material for covering at least said pixel electrode and said gate lines at said crossing points; and
    drain lines, wherein
    said drain lines and source lines are formed on said first and second protecting films and connected to said drain and said source of said thin film transistor respectively, through a first contact hole formed in said first protecting film, and
    said drain lines are connected to said pixel electrode through a second contact hole formed in said second protecting film.

2. The active matrix liquid crystal display device according to claim 6, wherein said first protecting film consists essentially of $SiO_2$, and said insulating film for said storage capacitor consists essentially of a third insulating material selected from the group consisting of $Ta_2O_5$, $Si_3N_4$, $Al_2O_3$ and $TiO$.

3. The active matrix liquid crystal display device according to claim 2, wherein said insulating film for said storage capacitor is patterned so that a part thereof is not overlapped with a pattern of said first protecting film in at least a part of said thin film transistor, and said insulating film for said storage capacitor is removed from at least a part of a region over said thin film transistor.

4. The active matrix liquid crystal display device according to claim 3, wherein said second insulating material is selected from the group consisting of $Ta_2O_5$, $Si_3N_4$, $Al_2O_3$, $TiO$ and $SiO_2$.

5. The active matrix liquid crystal display device according to claim 4, wherein said second protecting film is patterned so that a part thereof is not overlapped with a pattern of said first protecting film and said insulating film for said storage capacitor in at least a part of said thin film transistor, and said second protecting film is removed from at least part of a region over said thin film transistor.

6. The active matrix liquid crystal display device according to claim 5, wherein said second protecting film is in contact with an end portion of said insulating film for said storage capacitor, and said first and said second protecting films isolate said insulating film for said storage capacitor from said drain line and said source line.

7. The active matrix liquid crystal display device according to claim 3, wherein said second protecting film covers said gate insulating film through said first protecting film.

8. The active matrix liquid crystal display device according to claim 7, wherein said second insulating material is $Si_3N_4$.

9. The active matrix liquid crystal display device according to claim 3, wherein said insulating film for said storage capacitor covers said gate insulating film through said first protecting film.

10. The active matrix liquid crystal display device according to claim 9, wherein said second insulating material is $Si_3N_4$.

* * * * *